(12) United States Patent
Nakayama (10) Patent No.: US 10,279,448 B2
(45) Date of Patent: May 7, 2019

(54) MACHINING SYSTEM AND REMOVAL SYSTEM HAVING MACHINING CHIP REMOVING FUNCTION

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 127 days.

(21) Appl. No.: 15/371,774

(22) Filed: Dec. 7, 2016

(65) Prior Publication Data
US 2017/0165803 A1 Jun. 15, 2017

(30) Foreign Application Priority Data

Dec. 10, 2015 (JP) .................................. 2015-240978

(51) Int. Cl.
*B23Q 17/24* (2006.01)
*B25J 9/16* (2006.01)
(Continued)

(52) U.S. Cl.
CPC ...... *B23Q 17/2471* (2013.01); *B23Q 11/0075* (2013.01); *B23Q 17/2409* (2013.01);
(Continued)

(58) Field of Classification Search
CPC ............ B23Q 11/0075; B23Q 17/2471; B23Q 17/2409; B25J 9/1697; G06T 7/001; G06T 2207/30164; H04N 7/183; G06K 9/6201
See application file for complete search history.

(56) References Cited

U.S. PATENT DOCUMENTS 1,507,771 A * 9/1924 Ferris ..................... B23D 43/00
                                                    15/93.1
5,353,823 A * 10/1994 Peter ................... B23Q 11/0042
                                                    134/1
(Continued)

FOREIGN PATENT DOCUMENTS

JP      H03158189 A      7/1991
JP      H03228543 A     10/1991
(Continued)

OTHER PUBLICATIONS

Decision to Grant a Patent for Japanese Application No. 2015-240978, dated May 22, 2018, including English translation, 4 pages.

*Primary Examiner* — Michael E Barr
*Assistant Examiner* — Benjamin L Osterhout
(74) *Attorney, Agent, or Firm* — RatnerPrestia (57) ABSTRACT

Disclosed is a machining system wherein provisions are made to be able to remove machining chips reliably without requiring human intervention. The machining system includes: an image processing unit which detects the position and amount of machining chips by comparing images captured of a workpiece and a machining tool before and after execution of a machining step; a condition judging unit which, based on the detected amount of machining chips, determines whether or not there is a need to execute a removal step; and a result judging unit which judges the result of the removal step by comparing the images captured of the workpiece W and the machining tool before and after the execution of the removal step.

15 Claims, 9 Drawing Sheets

(51) Int. Cl.
*G06T 7/00* (2017.01)
*G06K 9/62* (2006.01)
*B23Q 11/00* (2006.01)
*H04N 7/18* (2006.01)

(52) U.S. Cl.
CPC .......... *B25J 9/1697* (2013.01); *G06K 9/6201* (2013.01); *G06T 7/001* (2013.01); *H04N 7/183* (2013.01); *G06T 2207/30164* (2013.01)

(56) References Cited

U.S. PATENT DOCUMENTS

| | | | |
|---|---|---|---|
| 5,951,219 A * | 9/1999 | Stadtfeld | B23F 17/003 408/67 |
| 6,059,494 A | 5/2000 | Susnjara | |
| 9,943,966 B2 | 4/2018 | Shirahata | |
| 2002/0003415 A1 * | 1/2002 | Nakai | G05B 19/4065 318/569 |
| 2005/0155626 A1 * | 7/2005 | Nordstrom | B08B 1/04 134/2 |
| 2006/0096624 A1 * | 5/2006 | Stoll | A46B 13/008 134/104.2 |
| 2006/0269376 A1 * | 11/2006 | Stoll | B23Q 11/0046 409/137 |
| 2010/0200369 A1 * | 8/2010 | Suutarinen | B23Q 11/005 198/495 |
| 2010/0293739 A1 * | 11/2010 | Imamura | B23Q 11/005 15/319 |
| 2011/0265835 A1 * | 11/2011 | Sato | B23Q 17/0914 134/56 R |
| 2016/0184947 A1 * | 6/2016 | Itou | B23Q 11/0046 15/319 |
| 2016/0263687 A1 | 9/2016 | Matsunaga et al. | |
| 2016/0263745 A1 * | 9/2016 | Shirahata | B25J 9/1697 |
| 2016/0339553 A1 * | 11/2016 | Nakazawa | B23Q 11/10 |
| 2017/0043442 A1 | 2/2017 | Takikawa | |
| 2017/0113314 A1 | 4/2017 | Murota | |

FOREIGN PATENT DOCUMENTS

| | | |
|---|---|---|
| JP | H05084636 A | 4/1993 |
| JP | H06297292 A | 10/1994 |
| JP | H07256550 A | 10/1995 |
| JP | 08150537 A | 6/1996 |
| JP | H 10-096616 A | 4/1998 |
| JP | H 10-118884 A | 5/1998 |
| JP | 2001009388 A | 1/2001 |
| JP | 2001322049 A | 11/2001 |
| JP | 2002-096203 A | 4/2002 |
| JP | 2003-019466 A | 1/2003 |
| JP | 2010052102 A | 3/2010 |
| JP | 2010158726 A | 7/2010 |
| JP | 2013146651 A | 8/2013 |
| JP | 2014128857 A | 7/2014 |
| JP | 2015024455 A | 2/2015 |
| JP | 2015-159198 A | 9/2015 |
| JP | 2016120589 A | 7/2016 |
| JP | 2016168649 A | 9/2016 |
| JP | 2016168661 A | 9/2016 |
| JP | 2017035765 A | 2/2017 |
| JP | 2017080842 A | 5/2017 |

* cited by examiner

MACHINING SYSTEM AND REMOVAL SYSTEM HAVING MACHINING CHIP REMOVING FUNCTION

BACKGROUND OF THE INVENTION

1. Field of the Invention

The present invention relates to a machining system and a removal system for removing machining chips generated during machining by using a robot and an image capturing device.

2. Description of the Related Art

Japanese Unexamined Patent Publication No. 2003-019466, Japanese Patent Application No. 2015-159198, and Japanese Unexamined Patent Publication No. H10-118884 each disclose a cleaning system for removing machining chips generated during workpiece machining by using a high-pressure cleaning spray attached to a robot. To provide techniques for monitoring the condition of a workpiece or a machining tool during machining by using an image capturing device (refer to Japanese Unexamined Patent Publication Nos. 2002-096203 and H10-096616) is also known in the art.

A cleaning system that uses a high-pressure cleaning spray is effective for removing iron-based materials since the machining chips generated during machining are relatively small in size and the amount of generated chips is also small. However, in the case of a material having high toughness, i.e., a tenacious material, such as aluminum or stainless steel, the machining chips tend to be generated in the form of long strips and become intertwined like a bird's nest. Once such machining chips adhere to the workpiece or the machining tool, the machining chips cannot be easily removed.

If the machining chips remain near the part to be machined, not only does the machining accuracy drop, but the workpiece or the machining tool may also be damaged, and in some cases, this can result in damage to the machine tool. Accordingly, when machining a tough material, the machining operation must be interrupted periodically to check the condition of the part being machined or to remove the machining chips securely by using human hands.

SUMMARY OF THE INVENTION

There is therefore a need for a machining system wherein provisions are made to be able to remove machining chips reliably without requiring human intervention.

According to the present invention, there is provided a machining system which includes a machine tool equipped with a machining tool, a robot configured to be able to use selectively a gripper capable of gripping a workpiece to be machined by the machine tool and a removal tool used for removing machining chips, and an image capturing device attached to a moving part of the robot, wherein the machining system includes: an image processing unit which detects the position and amount of the machining chips adhering to the workpiece and the machining tool by comparing a first reference image acquired by shooting the workpiece and the machining tool with the image capturing device before starting the machining with a first target image acquired by shooting the workpiece and the machining tool with the image capturing device after starting the machining; a condition judging unit which determines whether or not there is a need to remove the machining chips, based on the amount of the machining chips detected by the image processing unit; a removal executing unit which, if it is determined by the condition judging unit that there is a need to remove the machining chips, then operates the robot and executes a removal step to remove the machining chips using the removal tool, based on the position of the machining chips detected by the image processing unit; and a result judging unit which judges the result of the removal step by comparing a second reference image acquired by shooting the workpiece and the machining tool with the image capturing device just before the execution of the removal step with a second target image acquired by shooting the workpiece and the machining tool with the image capturing device immediately after the execution of the removal step.

In a preferred embodiment, the removal executing unit is configured to reexecute the removal step if it is determined by the result judging unit that the result of the removal step has been insufficient.

In a preferred embodiment, the robot is configured to be able to selectively use a plurality of different types of removal tools, and the machining system further includes a removal tool selecting unit which, if it is determined by the result judging unit that the result of the removal step has been insufficient, then selects, based on the result of the removal step and the type of the removal tool used in the removal step last executed, the removal tool to be used in the removal step to be executed next time.

In a preferred embodiment, the machining system further includes an operation changing unit which, if it is determined by the result judging unit that the result of the removal step has been insufficient, then changes, based on the result of the removal step and the operation of the robot applied in the removal step last executed, the operation of the robot to be applied in the removal step to be executed next time.

In a preferred embodiment, the removal executing unit is configured to execute the removal step concurrently with a machining step being executed by the machine tool.

In a preferred embodiment, the machining system further includes a notifying unit which issues an alarm notification if the number of times in succession that the result judging unit has determined that the result of the removal step has been insufficient exceeds a predetermined number of times.

In a preferred embodiment, the machining system further includes a condition changing unit which, in response to a user input operation, changes a condition to be applied to the result judging unit for judging the result of the removal step.

In a preferred embodiment, there is provided a machining system which includes a machine tool equipped with a machining tool, a robot configured to be able to use selectively a gripper capable of gripping a workpiece to be machined by the machine tool and a removal tool used for removing machining chips, and an image capturing device attached to a moving part of the robot, wherein the machining system includes: an image processing unit which detects the position of the machining chips adhering to the machining tool by comparing a third reference image acquired by shooting the machining tool with the image capturing device before starting the machining with a third target image acquired by shooting the machining tool with the image capturing device after starting the machining; a condition judging unit which determines whether or not there is a need to remove the machining chips, based on the position of the machining chips detected by the image processing unit; a removal executing unit which, if it is determined by the condition judging unit that there is a need to remove the machining chips, then operates the robot and executes a removal step to remove the machining chips using the removal tool, based on the position of the machining chips detected by the image processing unit; and a result judging unit which judges the result of the removal step by comparing a fourth reference image acquired by shooting the machining tool, with no machining chips adhering thereto, with the image capturing device before starting the machining with a fourth target image acquired by shooting the machining tool with the image capturing device immediately after the execution of the removal step.

In a preferred embodiment, the removal executing unit is configured to reexecute the removal step if it is determined by the result judging unit that the result of the removal step has been insufficient.

In a preferred embodiment, the robot is configured to be able to selectively use a plurality of different types of removal tools, and the machining system further includes a removal tool selecting unit which, if it is determined by the result judging unit that the result of the removal step has been insufficient, then selects, based on the result of the removal step and the type of the removal tool used in the removal step last executed, the removal tool to be used in the removal step to be executed next time.

In a preferred embodiment, the machining system further includes an operation changing unit which, if it is determined by the result judging unit that the result of the removal step has been insufficient, then changes, based on the result of the removal step and the operation of the robot applied in the removal step last executed, the operation of the robot to be applied in the removal step to be executed next time.

In a preferred embodiment, the machining system further includes a notifying unit which issues an alarm notification if the number of times in succession that the result judging unit has determined that the result of the removal step has been insufficient exceeds a predetermined number of times.

In a preferred embodiment, the machining system further includes a condition changing unit which, in response to a user input operation, changes a condition to be applied to the result judging unit for judging the result of the removal step.

In a preferred embodiment, there is provided a removal system for removing machining chips adhering to a workpiece to be machined by a machining tool as well as machining chips adhering to the machining tool, wherein the removal system includes: a removal tool configured to remove the machining chips; an image capturing device configured to shoot images of the workpiece and the machining tool before and after the execution of a removal step for removing the machining chips using the removal tool; and a result judging unit which judges the result of the removal step by comparing a fifth reference image acquired by shooting the machining tool and the workpiece with the image capturing device just before the execution of the removal step with a fifth target image acquired by shooting the machining tool and the workpiece with the image capturing device immediately after the execution of the removal step.

In a preferred embodiment, there is provided a removal system for removing machining chips adhering to a machining tool, wherein the removal system includes: a removal tool configured to remove the machining chips; an image capturing device configured to shoot images of the machining tool before and after the execution of a removal step for removing the machining chips using the removal tool; and a result judging unit which judges the result of the removal step by comparing a sixth reference image acquired by shooting the machining tool, with no machining chips adhering thereto, with the image capturing device before starting the machining with a sixth target image acquired by shooting the machining tool with the image capturing device immediately after the execution of the removal step.

BRIEF DESCRIPTION OF THE DRAWINGS

These and other objects, features, and advantages of the present invention will become more apparent from the detailed description of the illustrative embodiments as set forth below with reference to the accompanying drawings, wherein.

DETAILED DESCRIPTION

Embodiments of the present invention will be described below with reference to the accompanying drawings. To aid understanding of the present invention, the scale to which the component elements of the illustrated embodiments are drawn is changed as needed. Further, the same reference numerals are used to designate the same or corresponding component elements.

Figure 1:
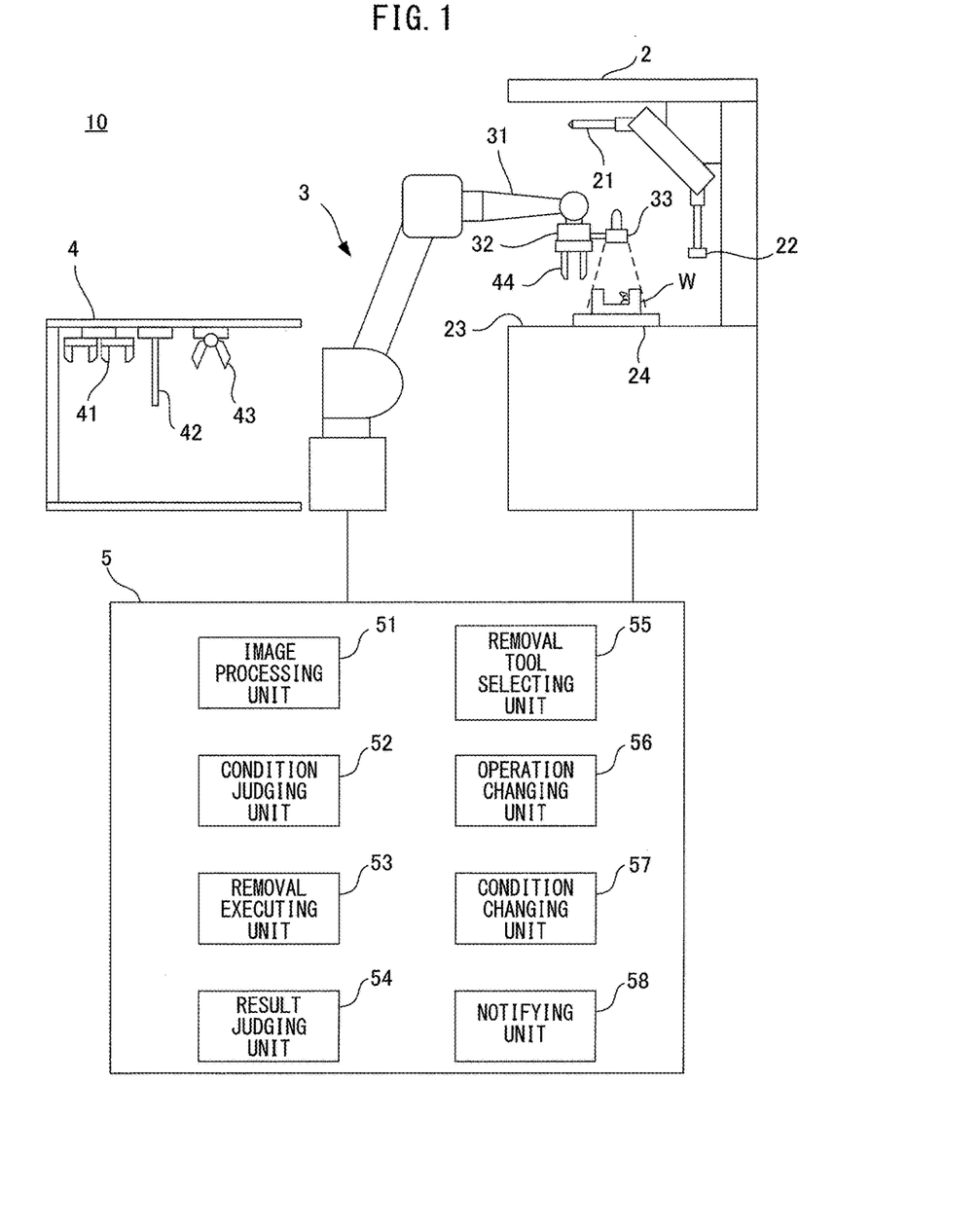
FIG. 1 is a diagram showing a configuration example of a machining system.

A machining system according to a first embodiment will be described with reference to FIGS. 1 to 10. FIG. 1 shows one configuration example of the machining system 10. The machining system 10 includes a machine tool 2, a robot 3, a tool stocker 4, and a controller 5.

The machine tool 2 is equipped with machining tools 21 and 22 used for machining a workpiece W, and a table 23 on which the workpiece W is placed. The machining tools 21 and 22 are tools of differing types provided for different machining operations such as cutting, drilling, and severing. The machining tools 21 and 22 are selectively used according to the machining operation to be performed. The machine tool 2 may be equipped with three or more machining tools. The workpiece W is held fixedly on the table 23 of the machine tool 2 by a jig 24 such as a chuck in order not to move out of position.

Figure 2:
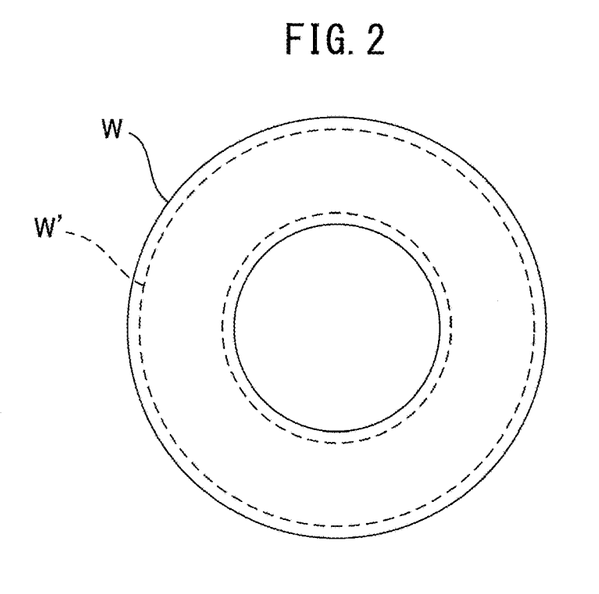
FIG. 2 is a diagram showing a workpiece before and after machining.

The workpiece W is a circular member in which a recessed portion is formed in a concentric fashion. Referring to FIG. 2, which shows the workpiece W as seen from above, the workpiece W before machining is indicated by solid lines, and the workpiece W after machining is indicated by dashed lines. That is, the workpiece W is machined along the outer wall face of the workpiece W and the circumferential wall defining the recessed portion.

The robot 3 is an articulated robot configured to be able to position the end of its arm 31 in any desired orientation and position within the work envelope determined by the machine configuration. The robot 3 is, for example, a six-axis vertically articulated robot as shown.

Figure 3:
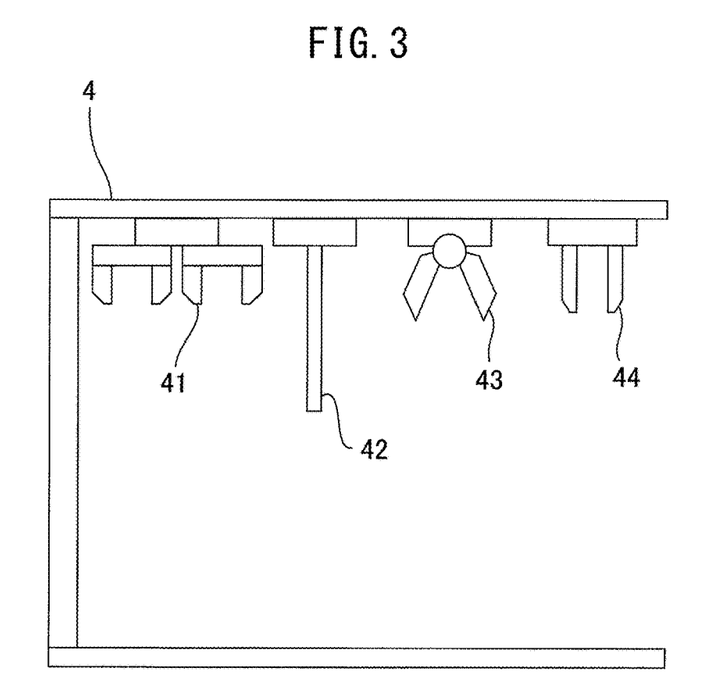
FIG. 3 is a diagram showing tools to be attached to a robot's wrist.

The robot 3 is equipped with a tool which is replaceably mounted to a wrist 32 provided at the end of the arm 31. The tool to be used by the robot 3 is stored in the tool stocker 4. As shown in FIG. 3, in the present embodiment, removal tools for removing machining chips, for example, a high-pressure cleaning nozzle 42, a clipping tool 43, and a gripping tool 44, are provided in addition to a double hand 41 used for gripping the workpiece W. If the robot is one having a large payload capacity, all of the tools that can be selectively used may be mounted to the wrist.

Figure 4A:
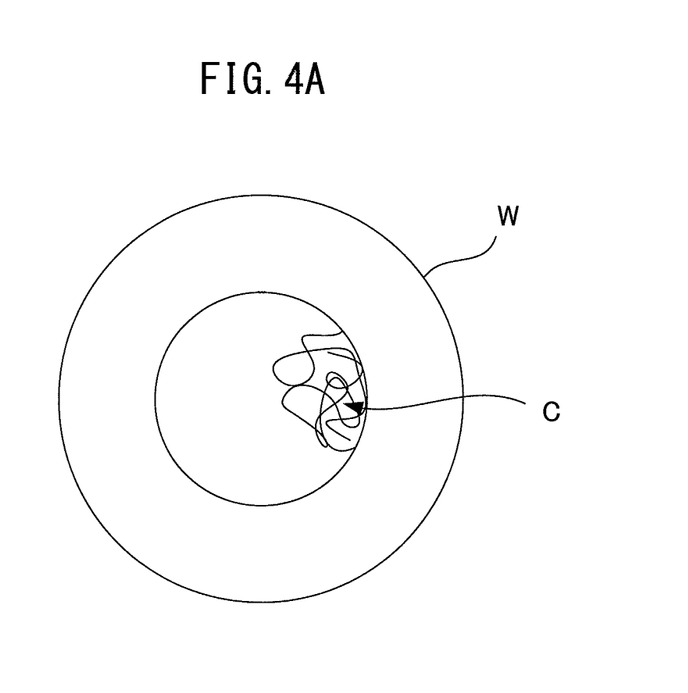
FIG. 4A is a diagram showing the workpiece whose image is captured by an image capturing device.
Figure 4B:
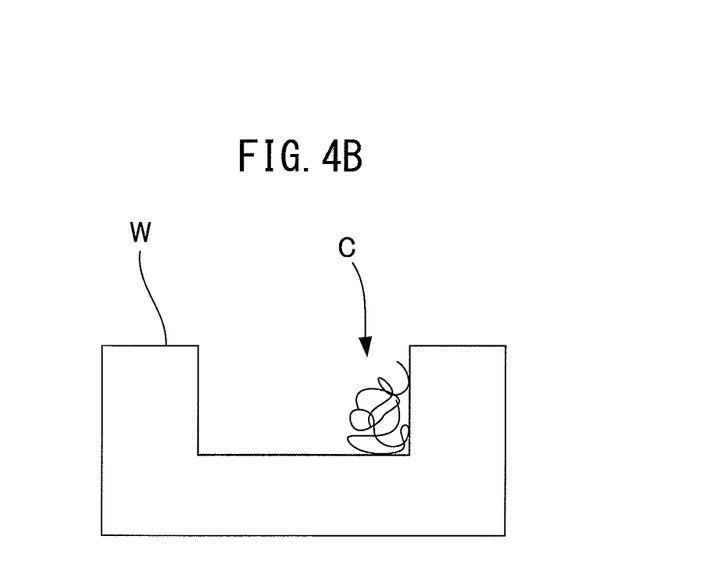
FIG. 4B is a diagram showing the workpiece whose image is captured by the image capturing device.

FIGS. 4A and 4B show the machining chips C generated during machining of the workpiece W. FIG. 4A is a top view of the workpiece W, and FIG. 4B is a side view of the workpiece W. As shown, the machining chips C intertwined with each other adhere to the workpiece W at a position near the circumferential wall of the recessed portion.

Figure 5A:
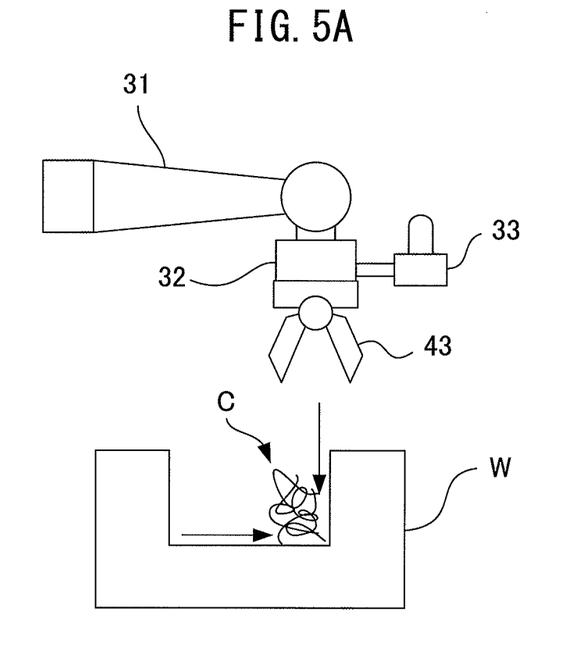
FIG. 5A is a diagram showing a machining chip removal step using a clipping tool.

FIG. 5A shows a removal step for removing the machining chips C using the clipping tool 43. The robot 3 cuts off the machining chips C away from the workpiece W by moving the clipping tool 43 along the surface of the workpiece W.

Figure 5B:
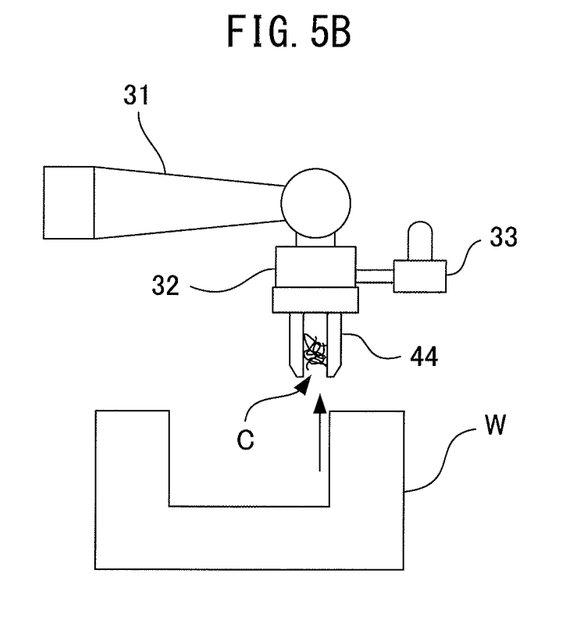
FIG. 5B is a diagram showing a machining chip removal step using a gripping tool.

FIG. 5B shows a removal step for removing the machining chips C using the gripping tool 44. The robot 3 removes the machining chips C from the workpiece W by causing the gripping tool 44 to grip the machining chips C and moving it away from the workpiece W.

Referring back to FIG. 1, an image capturing device 33 is attached to the wrist 32 of the robot 3. The image capturing device 33 includes, for example, a CMOS image sensor, a CCD image sensor, or the like. The image capturing device 33 is used to capture an image of a target object and acquire image data of the target object. The image capturing device 33 may alternatively be attached to the arm 31 of the robot 3. The image capturing device 33 may be detachably mounted to the robot 3. In that case, a jig such as a positioning pin may be provided in a connecting portion between the image capturing device 33 and the robot 3 in order to accurately reproduce the mounting position of the image capturing device 33 relative to the robot 3. The image data acquired by the image capturing device 33 may be two-dimensional image data or three-dimensional image data. The image data acquired by the image capturing device 33 is supplied to an image processing unit 51 in the controller 5, as will be described later.

The controller 5 is a digital computer which includes a CPU, RAM, ROM, nonvolatile memory, and various interfaces. The controller 5 may be constructed from a single computer, or may be constructed from a plurality of computers cooperating with each other to implement the various functions to be described later. For example, an image processing device which implements the function of the image processing unit 51 may be provided separately from the controller 5.

As shown in FIG. 1, the controller 5 includes, in addition to the image processing unit 51, a condition judging unit 52, a removal executing unit 53, a result judging unit 54, a removal tool selecting unit 55, an operation changing unit 56, a condition changing unit 57, and a notifying unit 58.

The image processing unit 51 processes the image data of the target object acquired by the image capturing device 33. Technology necessary for image processing is known, and therefore will not be described in detail herein. In one embodiment, the image processing unit 51 detects the position and amount of the machining chips adhering to the workpiece W and the machining tool 21, 22 by comparing a reference image acquired by shooting the workpiece W and the machining tool 21, 22 before starting the machining with a target image acquired by shooting the workpiece W and the machining tool 21, 22 after starting the machining. In one embodiment, the image processing unit 51 successively detects the position and amount of the machining chips by using the target image acquired at predetermined intervals of time, for example, at intervals of 30 minutes.

The condition judging unit 52 determines whether or not there is a need to remove the machining chips, based on the amount of the machining chips adhering to the workpiece W and the machining tool 21, 22 detected by the image processing unit 51. The result of the determination by the condition judging unit 52 is supplied to the removal executing unit 53. In one embodiment, if the amount of machining chips exceeds 100 cm$^3$, the condition judging unit 52 determines that there is a need to remove the machining chips.

If it is determined by the condition judging unit 52 that there is a need to remove the machining chips, the removal executing unit 53 operates the robot 3 and executes a removal step to remove the machining chips using the removal tool, for example, the gripping tool 44, based on the position of the machining chips detected by the image processing unit 51.

In one embodiment, the removal executing unit 53 may select the removal tool to be used in the removal step, based on the detected amount of machining chips. For example, the removal executing unit 53 may be configured to execute the removal step using the clipping tool 43 when the amount of machining chips is larger than 200 cm$^3$.

In one embodiment, the removal executing unit 53 may select the operation of the robot 3 for the removal step, based on the detected amount of machining chips. For example, the removal executing unit 53 may be configured to execute the removal step with a greater pulling force by increasing the acceleration of the robot 3 when the amount of machining chips is larger than 200 cm$^3$.

The result judging unit 54 judges the result of the removal step by comparing a reference image acquired by shooting the workpiece W and the machining tool 21, 22 just before the execution of the removal step with a target image acquired by shooting the workpiece W and the machining tool 21, 22 immediately after the execution of the removal step. In one embodiment, the result judging unit 54 determines that a sufficiently good result has been obtained if the amount of machining chips remaining after the removal step is not larger than 1 cm$^3$.

If it is determined by the result judging unit 54 that the result of the removal step has been insufficient, the removal tool selecting unit 55 selects, based on the result of the removal step and the type of the removal tool used in the removal step last executed, the removal tool to be used in the removal step to be executed next time. In one embodiment, the removal tool selecting unit 55 selects for the next removal step a removal tool having a high removal capability than the removal tool used in the removal step last executed. However, when it is recognized that a certain degree of effectiveness has been obtained from the removal step, in particular, when it is expected that the machining chips can be reliably removed in the next removal step, the same removal tool may continue to be used in the next removal step.

If it is determined by the result judging unit 54 that the result of the removal step has been insufficient, the operation changing unit 56 changes, based on the result of the removal step and the operation of the robot 3 applied in the removal step last executed, the operation of the robot 3 to be applied in the removal step to be executed next time. In one embodiment, the operation changing unit 56 executes the next removal step by operating the robot 3 with greater acceleration than that applied in the last executed removal step. This means increasing the force to be applied to remove the machining chips in the removal step.

The condition changing unit 57, in response to a user input operation, changes a condition to be applied to the result judging unit 54 for judging the result of the removal step. When judging the result by comparing the amount of machining chips remaining after the removal step with a threshold value, the condition changing unit 57 changes the threshold value to be used for the judgment in accordance with the user operation. In this way, the total machining time can be minimized, while maintaining the minimum necessary machining accuracy expected by the user.

If the number of times in succession that the result judging unit 54 has determined that the result of the removal step has been insufficient exceeds a predetermined number of times, the notifying unit 58 issues an alarm notification. The alarm notification is made in a suitable manner that can be perceived by the user. For example, the alarm notification is made in any suitable form such as sound, light, or text information.

Figure 6:
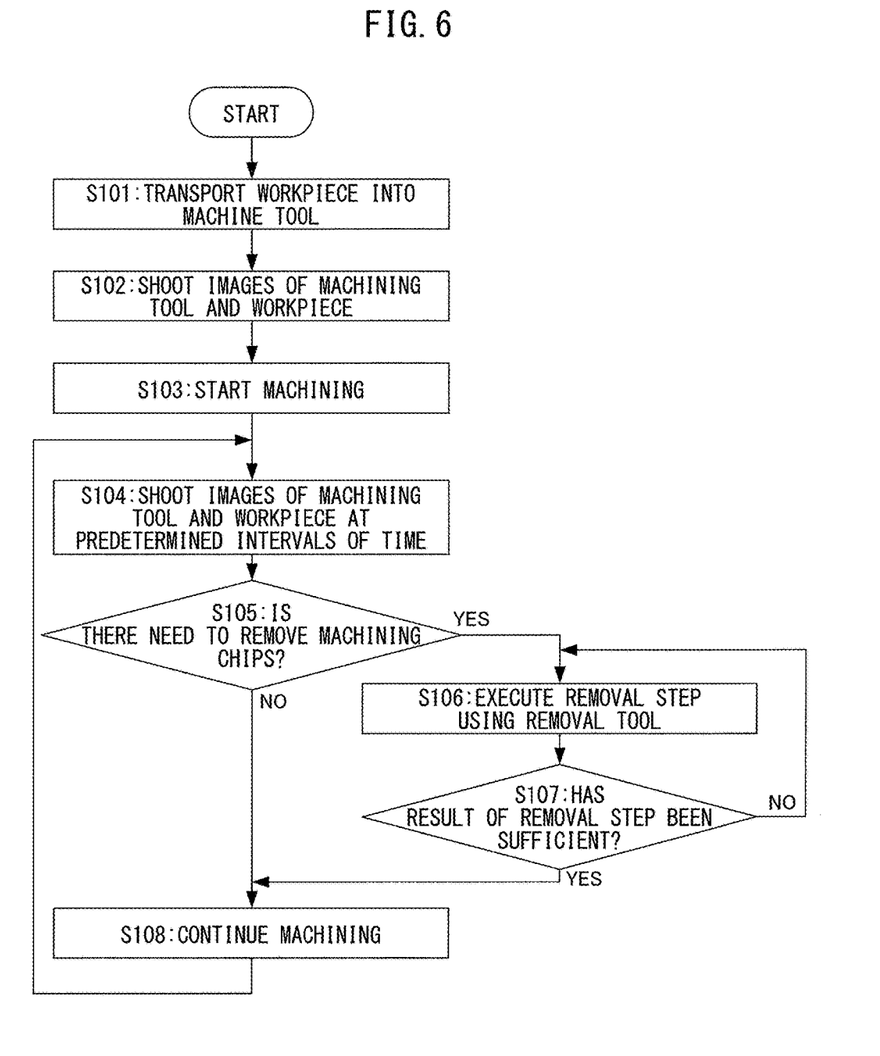
FIG. 6 is a flowchart illustrating a machining process performed by a machining system according to a first embodiment.

The machining process performed by the machining system 10 according to the present embodiment will be described with reference to FIG. 6.

In step S101, the workpiece W to be machined is transported into the machine tool 2 by holding it with one of the chucks of the double hand 41 of the robot 3. When machining one workpiece W after another, the robot 3 operates to transport the machined workpiece W out of the machine tool 2 before transporting the workpiece W to be machined into the machine tool 2. More specifically, the machined workpiece W is removed from the jig 24 by holding it with the other chuck of the double hand 41, and then the workpiece W to be machined is set in the jig 24.

In step S102, images of the machining tool 21, 22 and the workpiece W are shot by the image capturing device 33 attached to the wrist 32 of the robot 3.

In step S103, the machine tool 2 starts to machine the workpiece W by using the machining tool 21, 22.

After starting the machining, images of the machining tool 21, 22 and the workpiece W are shot by the image capturing device 33 at predetermined intervals of time (step S104). The image acquired in step S104 is compared with the image acquired in step S102 by the image processing unit 51.

In step S105, the condition judging unit 52 determines whether or not there is a need to remove the machining chips.

If the determination in step S105 is affirmative (i.e., if it is determined that there is a need to remove the machining chips), the process proceeds to step S106. In step S106, the machining chip removal step is executed by operating the robot 3 equipped with the removal tool.

In step S107, the result judging unit 54 determines whether the result of the removal step has been sufficient or not, that is, whether the machining chips have been removed sufficiently or not. If the result of the removal step has been insufficient, the process returns to step S106 to reexecute the removal step. When reexecuting the step S106, the removal tool or the operation of the robot 3 may be changed as needed.

On the other hand, if it is determined that the result of the removal step has been sufficient, the process proceeds to step S108 to continue the machining operation.

If it is determined in step S105 that there is no need to remove the machining chips, the process proceeds to step S108 to continue the machining operation, and the process returns to step S104. That is, the determination in step S105 is repeatedly performed based on the image data acquired at predetermined intervals of time.

In one embodiment, the machining operation of the machine tool 2 may be performed concurrently with the step of shooting the image of the machining tool 21, 22 and the workpiece W in order to determine whether there is a need to remove the machining chips (step S104) and the step of executing the removal step using the removal tool (step S106). For example, the machine tool 2 may perform the changing of the machining tool 21, 22 or the cleaning of the interior of the machine tool or the like during the execution of the removal step.

Figure 7:
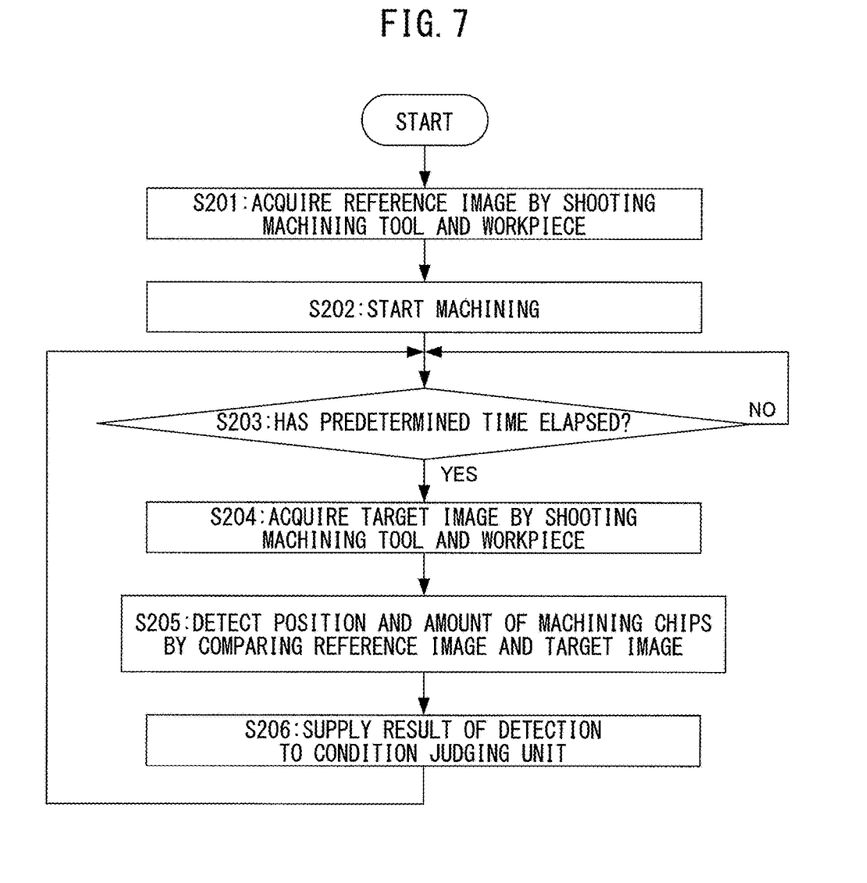
FIG. 7 is a flowchart illustrating a process related to the function of an image processing unit.

Referring to FIG. 7, the process related to the function of the image processing unit 51 will be described. In step S201, the machining tool 21, 22 before the workpiece W is machined and the workpiece W to be machined are shot by the image capturing device 33 to acquire the reference image.

In step S202, the machine tool 2 starts to machine the workpiece W. In step S203, it is determined whether a predetermined time (for example, 30 minutes) has elapsed or not. When the predetermined time has elapsed, the process proceeds to step S204.

In step S204, the machining tool 21, 22 and the workpiece W to are shot by the image capturing device 33 under the same conditions as in step S201, to acquire the target image.

In step S205, the image processing unit 51 compares the target image with the reference image, and detects the position and amount of the machining chips adhering to the machining tool 21, 22 and the workpiece W. If the image acquired by the image capturing device 33 is a three-dimensional image, the volume occupied by the machining chips may be detected as the amount of machining chips. If the image acquired by the image capturing device 33 is a two-dimensional image, the area over which the machining chips spread may be detected as the amount of machining chips.

In step S206, data representing the position and amount of the machining chips is supplied to the condition judging unit 52.

Figure 8:
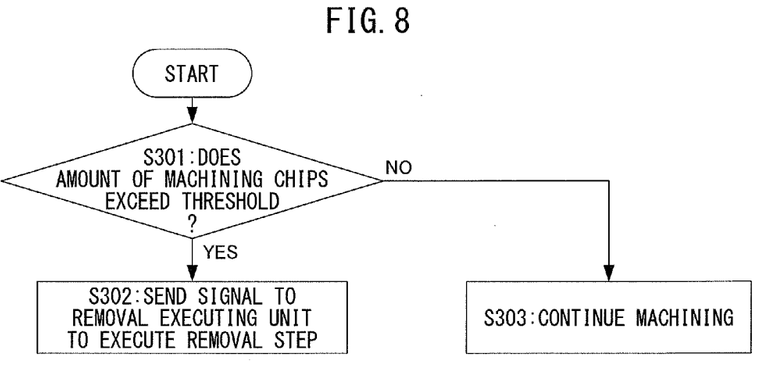
FIG. 8 is a flowchart illustrating a process related to the function of a condition judging unit.

Referring to FIG. 8, the process related to the function of the condition judging unit 52 will be described. In step S301, it is determined whether the amount of machining chips exceeds the threshold value. The amount of machining chips is obtained by the image processing unit 51 by comparing the target image with the reference image, as described above.

If the amount of machining chips exceeds the threshold value (for example, 100 cm$^3$), the process proceeds to step S302, and a signal is sent to the removal executing unit 53 to execute the removal step. On the other hand, if the amount of machining chips is within the threshold value, it is determined that there is no need to execute the removal step, and the machining of the workpiece W is continued (step S303).

Figure 9:
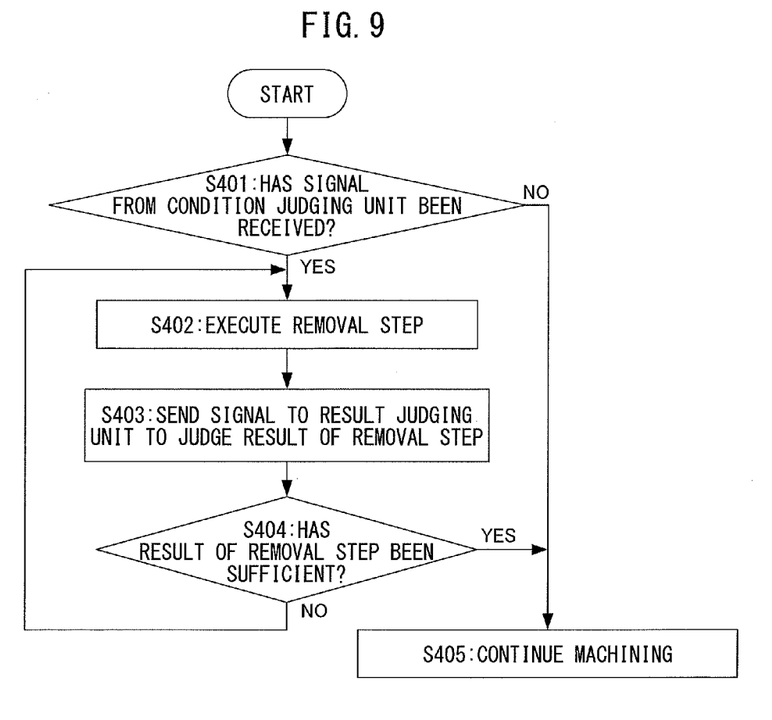
FIG. 9 is a flowchart illustrating a process related to the function of a removal executing unit.

Referring to FIG. 9, the process related to the function of the removal executing unit 53 will be described. In step S401, it is determined whether the signal directing the execution of the removal step has been received from the condition judging unit 52. If no such signal is received, the process proceeds to step S405 to continue the machining operation.

If the signal has been received from the condition judging unit 52 (that is, if the determination in step S401 is affirmative), the process proceeds to step S402, and the machining chip removal step is executed using the removal tool attached to the wrist 32 of the robot 3.

In step S403, a signal is sent to the result judging unit 54 to judge the result of the removal step. In step S404, the result judging unit 54 determines whether the result of the removal step has been sufficient or not. If the result of the removal step has been insufficient, the process returns to step S402 to reexecute the removal step. On the other hand, if the result of the removal step has been sufficient, the process proceeds to step S405 to continue the machining operation.

Figure 10:
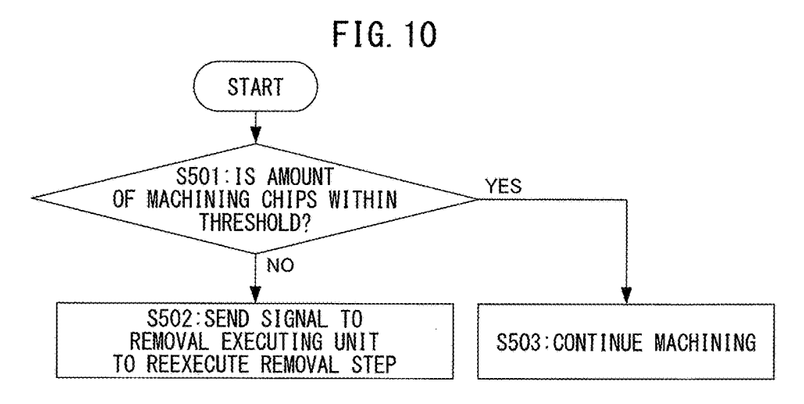
FIG. 10 is a flowchart illustrating a process related to the function of a result judging unit.

Referring to FIG. 10, the process related to the function of the result judging unit 54 will be described. In step S501, it is determined, based on the result of the detection made by the image processing unit 51, whether the amount of machining chips remaining after the execution of the removal step is within the threshold value or not. The threshold value may be changed as needed by the user. For example, the user appropriately sets the threshold value, for example, according to the size and material of the workpiece W.

If the amount of machining chips is within the threshold value (for example, 1 cm$^3$), the process proceeds to step S503 to continue the machining operation. On the other hand, if the amount of machining chips exceeds the threshold value, the process proceeds to step S502, and a signal is sent to the removal executing unit 53 to reexecute the removal step.

If the result judging unit 54 has determined that the amount of machining chips remaining after the execution of the removal step has exceeded the threshold value a predetermined number of times in succession, the notifying unit 58 issues an alarm notification to the user. If the machining chips cannot be removed sufficiently despite repeated execution of the removal process, there is the possibility that the removal step has not been executed properly because of some kind of fault. Accordingly, by issuing an alarm to the user, the user can be prompted to eliminate the cause of the fault.

The machining system 10 according to the above embodiment offers the following advantageous effects.

(1) By comparing the images acquired of the machining tool and the workpiece before and after the removal step, it is determined whether the machining chips have been removed properly. Since the conditions of the machining tool and the workpiece can be checked without requiring human intervention, the whole process can be automated. For example, when machining a workpiece made of a material having high toughness, such as aluminum or stainless steel, it tends to become difficult to execute the removal step properly. However, according to the present embodiment, since the machining system has the function of checking the effectiveness of the executed removal step, the removal step can be executed in a reliable manner regardless of the machining conditions of the material or the amount of machining of the workpiece, etc.

(2) If it is determined after execution of the removal step that the machining chips have not been removed sufficiently, the removal step is repeated. It thus becomes possible to execute the machining chip removal step in a more reliable manner.

(3) The proper removal tool is selected according to the condition of the adhering machining chips. It thus becomes possible to execute the machining chip removal step efficiently.

(4) The operation of the robot when executing the removal step is selected according to the condition of the adhering machining chips. It thus becomes possible to execute the machining chip removal step efficiently.

(5) The machining chip removal step can be executed without interrupting the machining operation. This serves to improve overall work efficiency.

(6) If the machining chips cannot be removed even if the removal step has been executed a predetermined number of times in succession, an alarm notification is issued. This makes it possible to prevent the robot from executing the machining chip removal step repeatedly when some kind of fault has occurred.

(7) The criterion for judging the result of the machining chip removal step is set as desired by the user. Since this ensures proper execution of the removal step according to the situation, the efficiency of the machining operation improves.

A machining system 10 according to a second embodiment will be described with reference to FIGS. 11 to 13. Descriptions previously given in connection with the first embodiment will be omitted except where necessary.

The machining tool may include parts that can seriously affect the machining accuracy. If machining chips adhere to such parts, the adhering chips can cause degradation of the machining accuracy even if the amount of adhering chips is small. Accordingly, in the present embodiment, the machining system 10 according to the present embodiment is configured to execute the removal step without delay when machining chips adhere to any of such specific portions of the machining tool.

In the present embodiment, the image processing unit 51 is configured to detect the position of the machining chips adhering to the machining tool 21, 22 by comparing a reference image acquired by shooting the machining tool 21, 22 with the image capturing device 33 before starting the machining with a target image acquired by shooting the machining tool 21, 22 with the image capturing device 33 after starting the machining.

The result judging unit 54 is configured to judge the result of the removal step by comparing a reference image acquired by shooting the machining tool 21, 22, with no machining chips adhering thereto, with the image capturing device 33 before starting the machining with a target image acquired by shooting the machining tool 21, 22 with the image capturing device 33 immediately after the execution of the removal step.

Figure 11:
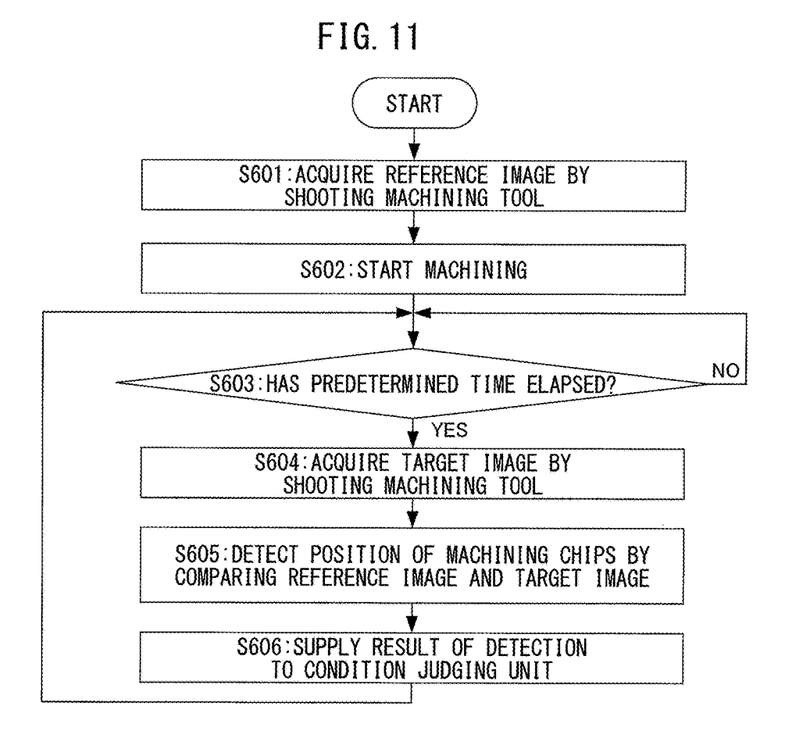
FIG. 11 is a flowchart illustrating a process related to the function of an image processing unit according to a second embodiment.

Referring to FIG. 11, the process related to the function of the image processing unit 51 will be described. In step S601, an image of the machining tool 21, 22 before starting the machining is shot by the image capturing device 33 to acquire the reference image.

In step S602, the machine tool 2 starts to machine the workpiece W. In step S603, it is determined whether a predetermined time has elapsed or not. When the predetermined time has elapsed, the process proceeds to step S604.

In step S604, the machining tool 21, 22 is shot with the image capturing device 33 under the same conditions as in step S601, to acquire the target image.

In step S605, the image processing unit 51 compares the target image with the reference image, and detects the position of the machining chips adhering to the machining tool 21, 22.

In step S606, data representing the position of the machining chips is supplied to the condition judging unit 52.

Figure 12:
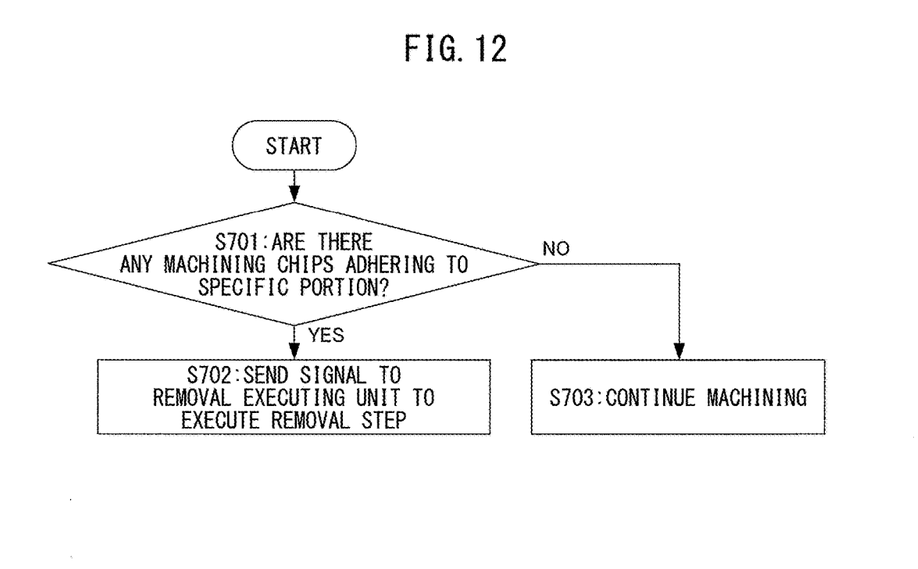
FIG. 12 is a flowchart illustrating a process related to the function of a condition judging unit.

Referring to FIG. 12, the process related to the function of the condition judging unit 52 will be described. In step S701, it is determined whether there are any machining chips adhering to a specific portion of the machining tool 21, 22. If any machining chips remain adhering to the portion that can affect the machining accuracy, the condition judging unit 52 determines that there is a need to remove such machining chips.

If it is determined that there are any machining chips adhering to the specific portion, the process proceeds to step S702, and a signal is sent to the removal executing unit 53 to execute the removal step. On the other hand, if there are no machining chips adhering to the specific portion, it is determined that there is no need to execute the removal step, and the machining of the workpiece W is continued (step S703).

The "specific portion" of the machining tool 21, 22, with reference to which the determination in step S701 is made, may be determined in advance or may be specified by the user.

Figure 13:
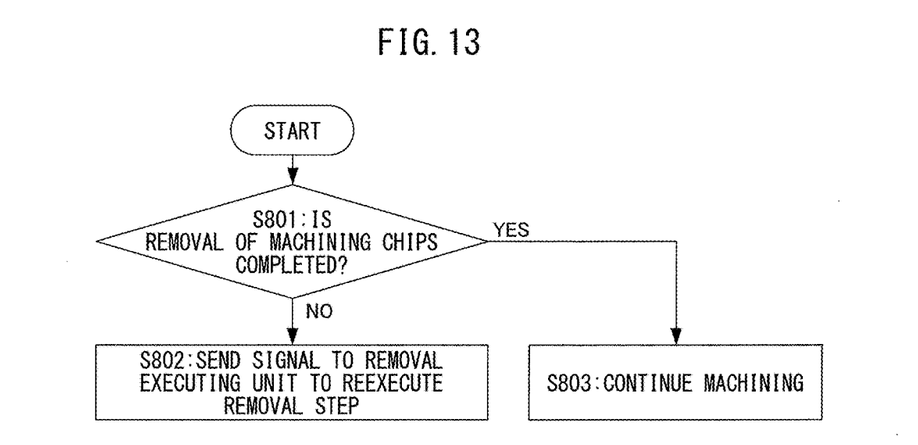
FIG. 13 is a flowchart illustrating a process related to the function of a result judging unit.

Referring to FIG. 13, the process related to the function of the result judging unit 54 will be described. In step S801, it is determined, based on the result of the detection made by the image processing unit 51, whether the removal of the machining chips is completed or not.

If the removal of the machining chips is completed, and there are no longer any machining chips adhering to the specific portion, the process proceeds to step S803 to continue the machining operation. On the other hand, if the removal of the machining chips is not completed yet, the process proceeds to step S802, and a signal is sent to the removal executing unit 53 to reexecute the removal step.

According to the second embodiment, if there are any machining chips adhering to the specific portion, the step of removing such machining chips from the machining tool is automatically executed. This prevents the machining accuracy from degrading due to the machining chips adhering to the machining tool.

Furthermore, according to the embodiment in which the portion from which any adhering machining chip should be removed is specified by the user, it becomes possible to prevent the machining accuracy from degrading due to the machining chips adhering to the machining tool even if the machining tool is a tool having a unique configuration.

While various embodiments of the present invention have been described above, those skilled in the art will recognize that the effects and advantages intended by the present invention can also be achieved by other embodiments. In particular, it is possible to omit or replace some of the component elements of the above embodiments or add some known means thereto without departing from the scope of the invention. It is also apparent to those skilled in the art that the invention can also be carried out by suitably combining the features of a plurality of embodiments explicitly or implicitly disclosed in this patent specification.

According to the machining system and removal system of the present application, the result of the machining chip removal step is judged by comparing the images acquired before and after the removal step. Since the condition of the machining chips can be checked with no requirement for human intervention, the whole process can be automated. Furthermore, if provisions are made to automatically execute necessary steps if the result of the removal step is insufficient, the machining chips can be removed reliably.

What is claimed is:

1. A machining system comprising: a machine tool equipped with a machining tool; a robot configured to be able to use selectively a gripper capable of gripping a workpiece to be machined by the machine tool and a removal tool used for removing machining chips; and an image capturing device attached to a moving part of the robot, wherein the machining system includes:
    an image processing unit which detects position and amount of the machining chips adhering to the workpiece and the machining tool by comparing a first reference image acquired by shooting the workpiece and the machining tool with the image capturing device before starting the machining with a first target image acquired by shooting the workpiece and the machining tool with the image capturing device after starting the machining;
    a condition judging unit which determines whether or not there is a need to remove the machining chips, based on the amount of the machining chips detected by the image processing unit;
    a removal executing unit which, if it is determined by the condition judging unit that there is a need to remove the machining chips, then operates the robot and executes a removal step to remove the machining chips using the removal tool, based on the position of the machining chips detected by the image processing unit; and
    a result judging unit which judges a result of the removal step by comparing a second reference image acquired by shooting the workpiece and the machining tool with the image capturing device just before the execution of the removal step with a second target image acquired by shooting the workpiece and the machining tool with the image capturing device immediately after the execution of the removal step.

2. The machining system according to claim 1, wherein the removal executing unit is configured to reexecute the removal step if it is determined by the result judging unit that the result of the removal step has been insufficient.

3. The machining system according to claim 2, wherein the robot is configured to be able to selectively use a plurality of different types of removal tools, and wherein
    the machining system further includes a removal tool selecting unit, which upon determination by the result judging unit that the result of the removal step has been insufficient, selects the removal tool to be used in the removal step to be executed next time based on the result of the removal step and the type of the removal tool used in the removal step executed prior to the next time.

4. The machining system according to claim 2, further comprising an operation changing unit, which upon determination by the result judging unit that the result of the removal step has been insufficient, changes the operation of the robot to be applied in the removal step to be executed next time based on the result of the removal step and the operation of the robot applied in the removal step prior to the next time.

5. The machining system according to claim 1, wherein the removal executing unit is configured to execute the removal step concurrently with a machining step being executed by the machine tool.

6. The machining system according to claim 2, further comprising a notifying unit which issues an alarm notification if the number of times in succession that the result judging unit has determined that the result of the removal step has been insufficient exceeds a predetermined number of times.

7. The machining system according to claim 1, further comprising a condition changing unit which, in response to a user input operation, changes a condition to be applied to the result judging unit for judging the result of the removal step.

8. A machining system comprising:
   a machine tool equipped with a machining tool;
   a robot configured to be able to use selectively a gripper capable of gripping a workpiece to be machined by the machine tool and a removal tool used for removing machining chips;
   an image capturing device attached to a moving part of the robot;
   an image processing unit which detects position of the machining chips adhering to the machining tool by comparing a first reference image acquired by shooting the machining tool with the image capturing device before starting the machining with a first target image acquired by shooting the machining tool with the image capturing device after starting the machining;
   a condition judging unit which determines whether or not there is a need to remove the machining chips, based on the position of the machining chips detected by the image processing unit;
   a removal executing unit which, if it is determined by the condition judging unit that there is a need to remove the machining chips, then operates the robot and executes a removal step to remove the machining chips using the removal tool, based on the position of the machining chips detected by the image processing unit; and
   a result judging unit which judges a result of the removal step by comparing a second reference image acquired by shooting the machining tool, with no machining chips adhering thereto, with the image capturing device before starting the machining with a second target image acquired by shooting the machining tool with the image capturing device immediately after the execution of the removal step.

9. The machining system according to claim 8, wherein the removal executing unit is configured to reexecute the removal step if it is determined by the result judging unit that the result of the removal step has been insufficient.

10. The machining system according to claim 9, wherein the robot is configured to be able to selectively use a plurality of different types of removal tools, and wherein the machining system further includes a removal tool selecting unit, which upon determination by the result judging unit that the result of the removal step has been insufficient, selects the removal tool to be used in the removal step to be executed next time based on the result of the removal step and the type of the removal tool used in the removal step executed prior to the next time.

11. The machining system according to claim 9, further comprising an operation changing unit which, upon determination by the result judging unit that the result of the removal step has been insufficient, changes the operation of the robot to be applied in the removal step to be executed next time based on the result of the removal step and the operation of the robot applied in the removal step prior to the next time.

12. The machining system according to claim 9, further comprising a notifying unit which issues an alarm notification if the number of times in succession that the result judging unit has determined that the result of the removal step has been insufficient exceeds a predetermined number of times.

13. The machining system according to claim 8, further comprising a condition changing unit which, in response to a user input operation, changes a condition to be applied to the result judging unit for judging the result of the removal step.

14. A removal system for removing machining chips adhering to a workpiece to be machined by a machining tool as well as machining chips adhering to the machining tool, comprising:
   a removal tool configured to remove the machining chips;
   an image capturing device configured to shoot images of the workpiece and the machining tool before and after execution of a removal step for removing the machining chips using the removal tool; and
   a result judging unit which judges a result of the removal step by comparing a first reference image acquired by shooting the machining tool and the workpiece with the image capturing device just before the execution of the removal step with a first target image acquired by shooting the machining tool and the workpiece with the image capturing device immediately after the execution of the removal step.

15. A removal system for removing machining chips adhering to a machining tool, comprising:
   a removal tool configured to remove the machining chips;
   an image capturing device configured to shoot images of the machining tool before and after execution of a removal step for removing the machining chips using the removal tool; and
   a result judging unit which judges a result of the removal step by comparing a first reference image acquired by shooting the machining tool, with no machining chips adhering thereto, with the image capturing device before starting the machining with a first target image acquired by shooting the machining tool with the image capturing device immediately after the execution of the removal step.

* * * * *